(12) United States Patent
Guo et al.

(10) Patent No.: US 11,218,650 B2
(45) Date of Patent: Jan. 4, 2022

(54) IMAGE PROCESSING METHOD, ELECTRONIC DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Ziqing Guo, Dongguan (CN); Haitao Zhou, Dongguan (CN); Kamwing Au, Dongguan (CN); Xiao Tan, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 77 days.

(21) Appl. No.: 16/523,292

(22) Filed: Jul. 26, 2019

(65) Prior Publication Data

US 2020/0045246 A1 Feb. 6, 2020

(30) Foreign Application Priority Data

Aug. 1, 2018 (CN) .......................... 201810867083.2
Aug. 1, 2018 (CN) .......................... 201810867102.1

(51) Int. Cl.
*H04N 5/33* (2006.01)
*H04N 5/232* (2006.01)
*G06K 9/00* (2006.01)

(52) U.S. Cl.
CPC ........... *H04N 5/33* (2013.01); *G06K 9/00248* (2013.01); *G06K 9/00255* (2013.01);
(Continued)

(58) Field of Classification Search
CPC .............. H04N 5/33; H04N 5/232935; H04N 5/23222; G06K 9/00248; G06K 9/00255; G06K 9/00281
(Continued)

(56) References Cited

U.S. PATENT DOCUMENTS 6,628,337 B1    9/2003  Yoshida
8,373,757 B1    2/2013  Nguyen
(Continued)

FOREIGN PATENT DOCUMENTS

CN       102262335 A    11/2011
CN       102542299 A     7/2012
(Continued)

OTHER PUBLICATIONS

International Search Report in the international application No. PCT/CN2019/075374, dated May 7, 2019.
(Continued)

*Primary Examiner* — Jae N Noh
(74) *Attorney, Agent, or Firm* — Ladas & Parry, LLP

(57) ABSTRACT

An image processing method, an image processing apparatus (700), an electronic device (10) and a computer-readable storage medium are provided. The image processing method includes: a temperature of a light emitter is detected (202); in condition that a temperature difference between a present temperature of the light emitter and an initial temperature exceeds a threshold, a target parameter is acquired (204); and a predetermined operation is performed according to the target parameter (206).

11 Claims, 8 Drawing Sheets

(52) U.S. Cl.
CPC ..... *G06K 9/00281* (2013.01); *H04N 5/23222* (2013.01); *H04N 5/232935* (2018.08)

(58) Field of Classification Search
USPC .......................................................... 348/164
See application file for complete search history.

(56) References Cited

U.S. PATENT DOCUMENTS

| | | | |
|---|---|---|---|
| 8,781,313 | B2 | 7/2014 | Uchiyama |
| 9,123,247 | B2 | 9/2015 | Negoro |
| 9,338,342 | B2 | 5/2016 | Shibata |
| 2012/0212806 | A1 | 8/2012 | Shibata |
| 2013/0002874 | A1 | 1/2013 | Negoro |
| 2013/0308933 | A1 | 11/2013 | Uchiyama |
| 2015/0350618 | A1* | 12/2015 | Meier .............. H04N 5/332 345/7 |
| 2018/0098009 | A1 | 4/2018 | Furuta |
| 2019/0081945 | A1* | 3/2019 | Chiang ............ G06K 9/209 |
| 2020/0043198 | A1* | 2/2020 | Guo ................. G06T 7/33 |
| 2020/0242792 | A1 | 7/2020 | Liu et al. |

FOREIGN PATENT DOCUMENTS

| | | | |
|---|---|---|---|
| CN | 102650720 | A | 8/2012 |
| CN | 103098110 | A | 5/2013 |
| CN | 103424954 | A | 12/2013 |
| CN | 104660901 | B | 1/2018 |
| CN | 107615021 | A | 1/2018 |
| CN | 107730561 | A1 | 2/2018 |
| CN | 107942463 | A | 4/2018 |
| CN | 108924426 | A | 11/2018 |
| CN | 109120846 | A | 1/2019 |
| TW | 200538843 | A | 12/2005 |
| WO | 2014101955 | A1 | 7/2014 |
| WO | 2018114471 | A1 | 6/2018 |

OTHER PUBLICATIONS

Written Opinion of the International Search Authority in the international application No. PCT/CN2019/075374, dated May 7, 2019.
First Office Action of the Taiwanese application No. 108120554, dated Feb. 24, 2020.
English translation of the International Search Report in the international application No. PCT/CN2019/075374, dated May 7, 2019.
Supplementary European Search Report in the European application No. 19186497.4, dated Nov. 27, 2019.
Office Action of the Indian application No. 201914030880, dated Apr. 15, 2021.
First Office Action of the European application No. 19186497.4, dated August 20, 2021.

* cited by examiner

IMAGE PROCESSING METHOD, ELECTRONIC DEVICE, AND COMPUTER-READABLE STORAGE MEDIUM

CROSS-REFERENCE TO RELATED APPLICATIONS

This application claims priority to Chinese Patent Applications No. 201810867102.1 and No. 201810867083.2, filed on Aug. 1, 2018, the disclosures of which are hereby incorporated by reference in their entireties.

TECHNICAL FIELD

The disclosure relates to the field of computer technology, and in particular to an image processing method, an image processing apparatus, an electronic device and a computer-readable storage medium.

BACKGROUND

With the development of computer technology, a depth image technology and an infrared image technology are widely used in scenes such as face recognition, human-computer interaction, image beautification or the like. An electronic device emits a light to an object through a light emitter such as a floodlight or a laser light, and a laser camera obtains a corresponding image according to the reflected light.

BRIEF DESCRIPTION OF DRAWINGS

In order to describe the technical solutions in the embodiments of the disclosure more clearly, the drawings required to be used in descriptions on the embodiments or the conventional art will be simply introduced below. It is apparent that the drawings in the following descriptions are only some embodiments of the disclosure. Those of ordinary skilled in the art may further obtain other drawings according to these drawings without creative work.

DETAILED DESCRIPTION

In order to make the objectives, technical solutions and advantages of the disclosure clearer, the disclosure will be described in detail below in combination with the drawings and the embodiments. It should be understood that specific embodiments described herein are only used to explain the disclosure and not intended to limit the disclosure.

It is to be understood that the terms "first", "second" and the like in the disclosure may be used to describe various elements, but not intended to limit these elements. These terms are only used to distinguish a first element from another element. For example, without departing from the scope of the disclosure, a first client may be called a second client, and similarly, the second client may be called the first client. Both the first client and the second client are clients, but not the same client.

Embodiments of the disclosure provide an image processing method, an image processing apparatus, an electronic device and a computer-readable storage medium.

The image processing method may include the following operations. A temperature of a light emitter is detected. In condition that a temperature difference between a present temperature of the light emitter and an initial temperature exceeds a threshold, a target parameter is acquired. A predetermined operation is performed according to the target parameter.

The image processing apparatus may include a temperature detection module, a parameter acquisition module and a predetermined operation module. The temperature detection module may be configured to detect a temperature of a light emitter. The parameter acquisition module may be configured to acquire a target parameter in condition that a temperature difference between a present temperature of the light emitter and an initial temperature exceeds a threshold. The predetermined operation module may be configured to perform a predetermined operation according to the target parameter.

The electronic device may include a memory and a processor. The memory may store a computer program. The computer program may be executed by the processor to cause the processor to perform the following operations. A temperature of a light emitter is detected. In condition that a temperature difference between a present temperature of the light emitter and an initial temperature exceeds a threshold, a target parameter is acquired. A predetermined operation is performed according to the target parameter.

The computer-readable storage medium may have a computer program stored thereon. The computer program may be executed by a processor to implement the following operations. A temperature of a light emitter is detected. In condition that a temperature difference between a present temperature of the light emitter and an initial temperature exceeds a threshold, a target parameter is acquired. A predetermined operation is performed according to the target parameter.

Figure 1:
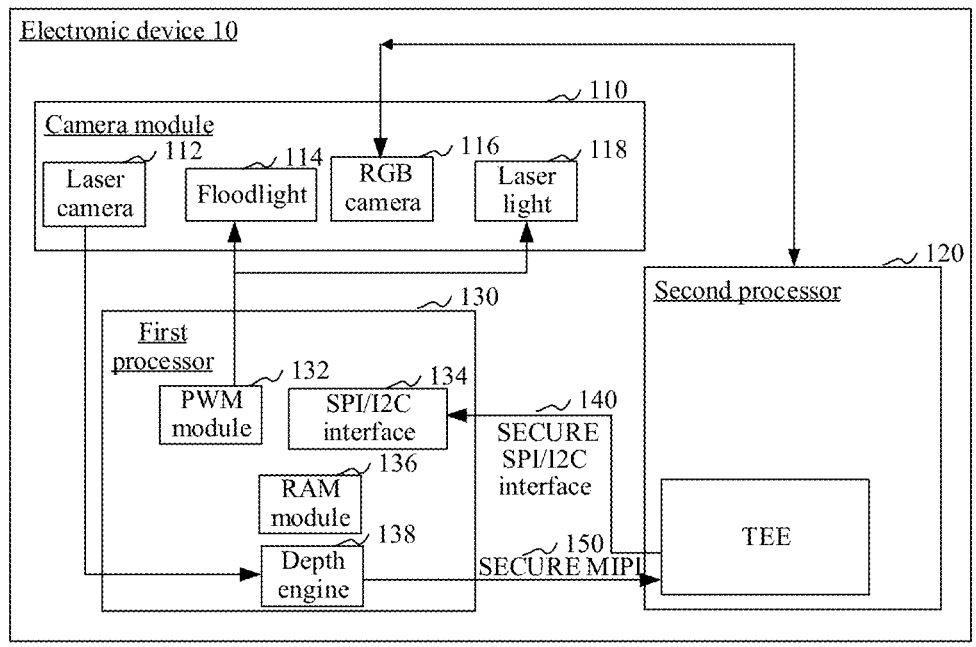
FIG. 1 schematically illustrates a module diagram of an electronic device according to some embodiments of the disclosure.

FIG. 1 is a module diagram of an electronic device 10 in one embodiment. As illustrated in FIG. 1, the electronic device 10 may include a camera module 110, a second processor 120 and a first processor 130. The second processor 120 may be a Central Processing Unit (CPU) module. The first processor 130 may be a Micro Controller Unit (MCU) module 130 or the like. The first processor 130 is connected between the second processor 120 and the camera module 110. The first processor 130 may control a laser camera 112, a floodlight 114 and a laser light 118 in the camera module 110, and the second processor 120 may control a Red/Green/Blue (RGB) camera 116 in the camera module 110.

The camera module 110 includes the laser camera 112, the floodlight 114, the RGB camera 116 and the laser light 118. The laser camera 112 is an infrared camera for acquiring an infrared image or a speckle image. The floodlight 114 is a point light source capable of emitting infrared light, and the laser light 118 is a point source capable of emitting infrared laser and forming a pattern by the emitted infrared laser. When the floodlight 114 emits infrared light, the laser camera 112 may acquire an infrared image according to reflected light. When the laser light 118 emits infrared laser, the laser camera 112 may acquire a speckle image according to reflected light. The speckle image is an image with the pattern formed by the infrared laser emitted by the laser light 118 subjected to deformation after the infrared laser is reflected.

The first processor 130 includes a Pulse Width Modulation (PWM) module 132, a Serial Peripheral Interface/Inter-Integrated Circuit (SPI/I2C) interface 134, a Random Access Memory (RAM) module 136, and a depth engine 138. The PWM module 132 may transmit a pulse to the camera module 110 to control the floodlight 114 or the laser light 118 to be turned on, so that the laser camera 112 may capture an infrared image or a speckle image. The SPI/I2C interface 134 is configured to receive a face capturing instruction sent by the second processor 120. The depth engine 138 may process the speckle image to obtain a depth disparity map.

When the second processor 120 receives a data acquisition request from an application, for example, when the application needs to perform face unlocking and face payment, a face capturing instruction is sent to the first processor 130 by a CPU core operating in a Trusted Execution Environment (TEE) through the SPI/I2C interface 134. After the first processor 130 receives the face capturing instruction, the first processor 130 controls the PWM module 132 to transmit a pulse signal to control the floodlight 114 to be turned on and controls the laser camera 112 to capture an infrared image simultaneously, and the first processor 130 also controls the laser light 118 in the camera module 110 to be turned on and controls the laser camera 112 to capture a speckle image. The camera module 110 may send the captured infrared image and speckle image to the first processor 130. The first processor 130 may process the received infrared image to obtain an infrared disparity map, and process the received speckle image to obtain a speckle disparity map or a depth disparity map. The processing on the infrared image and the speckle image by the first processor 130 refers to performing corrections on the infrared image or the speckle image, to remove the influence of internal and external parameters of the camera module 110 on the images. The first processor 130 may be set to different modes, and images output in different modes are different. When the first processor 130 is set to a speckle mode, the first processor 130 processes the speckle image to obtain a speckle disparity map, and a target speckle image may be obtained according to the speckle disparity map. When the first processor 130 is set to a depth map mode, the first processor 130 processes the speckle image to obtain a depth disparity map, and a depth image may be obtained according to the depth disparity map. The depth image refers to an image with depth information. The first processor 130 may send the infrared disparity map and the speckle disparity map to the second processor 120, and the first processor 130 may also send the infrared disparity map and the depth disparity map to the second processor 120. The second processor 120 may acquire a target infrared image according to the infrared disparity map, and acquire a depth image according to the depth disparity map. Further, the second processor 120 may perform face recognition, face matching, living body detection and acquisition of depth information of the detected face according to the target infrared image and the depth image.

The communication between the first processor 130 and the second processor 120 is performed through a fixed security interface to ensure the security of data transmission. As illustrated in FIG. 1, the second processor 120 sends data to the first processor 130 through a SECURE SPI/I2C 140, and the first processor 130 sends data to the second processor 120 through a SECURE Mobile Industry Processor Interface (MIPI) 150. In one example, the first processor 30 may send the infrared image, the speckle image, the infrared disparity map, the speckle disparity map, the depth disparity map, the depth image and the like to the second processor 120 through the SECURE MIPI 150.

In one embodiment, the electronic device 10 detects the temperature of a light emitter (i.e., the floodlight 114 and the laser light 118) in the camera module 110. When a temperature difference between a present temperature of the light emitter and an initial temperature exceeds a threshold, the first processor 130 may acquire a target parameter, and perform a predetermined operation according to the target parameter.

In the embodiments of the disclosure, the electronic device 10 may be a mobile phone, a tablet, a personal digital assistant, a wearable device or the like.

Figure 2:
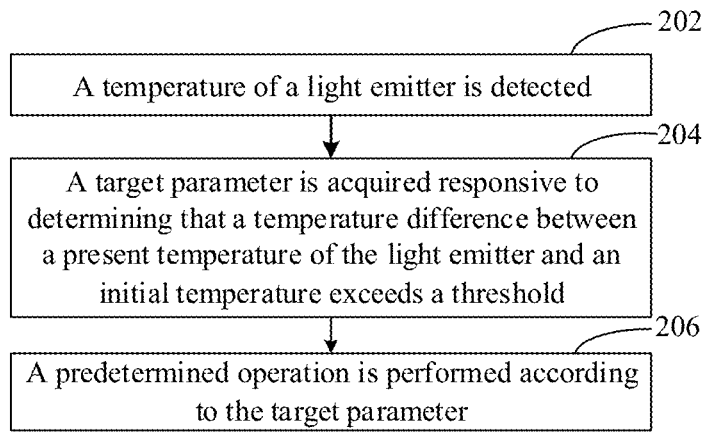
FIG. 2 to FIG. 12 illustrate a flowchart of an image processing method according to some embodiments of the disclosure.

FIG. 2 is a flowchart of an image processing method according to the disclosure. The image processing method of the disclosure is described by operating, for example, on the electronic device 10 in FIG. 1. As illustrated in FIG. 2, the image processing method includes operations in 202 to 206.

In 202, a temperature of a light emitter is detected.

In 204, a target parameter is acquired responsive to determining that a temperature difference between a present temperature of the light emitter and an initial temperature exceeds a threshold.

In 206, a predetermined operation is performed according to the target parameter.

Figure 3:
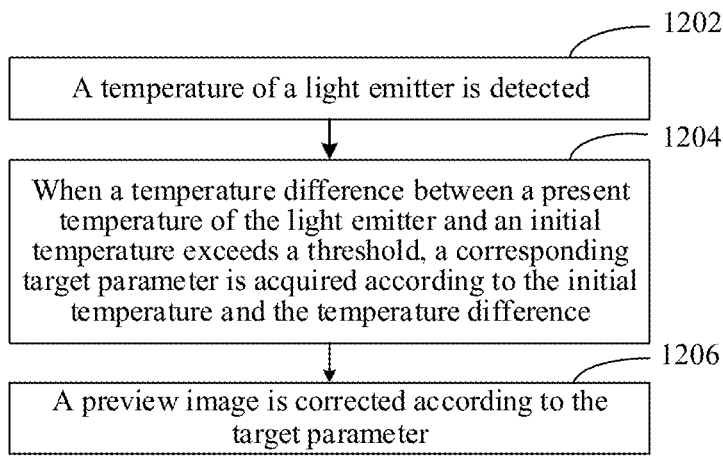

As illustrated in FIG. 3, in one embodiment, the image processing method of the disclosure includes operations in 1202 to 1206.

The operation in 202 includes the following action. In 1202, the temperature of the light emitter is detected.

The light emitter refers to a device for generating light in the camera module 110 of the electronic device 10. Specifically, the light emitter may include a floodlight 114 and a laser light 118 in FIG. 1. The electronic device 10 may detect the temperature of the light emitter by a built-in temperature sensor. Specifically, the electronic device 10 may preset a time interval, detect the temperature of the light emitter every preset time interval, or continuously detect the temperature of the light emitter, and may also detect the temperature of the light emitter when the service time of the light emitter is greater than a preset time length.

The operation in 204 includes the following action. In 1204, when the temperature difference between the present temperature of the light emitter and the initial temperature exceeds the threshold, a corresponding target parameter is acquired according to the initial temperature and the temperature difference.

The present temperature of the light emitter refers to the temperature of the light emitter detected by the electronic device 10 in real time. The initial temperature may be the temperature of the light emitter when the light emitter is enabled, or may be the temperature corresponding to one or more calibration parameters used when a camera captures an image. The calibration parameter refers to a parameter for determining a correspondence between a three-dimensional geometric position of a point on a surface of an object in space and its corresponding point in the image. Each camera is configured with the corresponding calibration parameter at the factory. The calibration parameter includes an internal parameter, an external parameter, and a distortion parameter. The threshold may be set according to the requirements of the actual application. For example, when measured using Celsius, the threshold may be 3 degrees, 4 degrees, 5 degrees, 6 degrees or the like, and is not limited thereto.

A target parameter refers to a compensation parameter determined according to the initial temperature and the temperature difference between the present temperature and the initial temperature, and is used to reduce the deviation of an image captured by the camera according to the initial calibration parameter due to the temperature change. Specifically, the target parameters include at least one compensation parameter in the internal parameter, the external parameter and the distortion parameter. When the camera is a dual camera, the electronic device may acquire target parameters corresponding to the two cameras respectively. For example, the camera may be at least one of the RGB camera 116 or the laser camera 112. The electronic device 10 may preset target parameters corresponding to different temperatures and temperature differences. Specifically, the electronic device 10 may pre-store different target parameters for different temperature differences under different initial temperatures. For example, when the initial temperature is 20 degrees, different target parameters are set for temperature differences less than minus 6 (−6) degrees, less than minus 3 (−3) degrees, greater than 3 degrees, and greater than 6 degrees respectively. When the temperature is 25 degrees, different target parameters are set for temperature differences less than minus 10 (−10) degrees, less than minus 5 (−5) degrees, and greater than 10 degrees respectively. The electronic device 10 may also pre-store target parameters corresponding to different temperature differences in different temperature gradients, that is, different target parameters are pre-stored for different temperature differences of different temperature ranges and the like.

When a temperature difference between the present temperature of the light emitter and the initial temperature exceeds the threshold, the electronic device 10 may search for a corresponding target parameter according to the initial temperature and the temperature difference.

The operation 206 includes the following action. In 1206, a preview image is corrected according to the target parameter.

The preview image is generated through capturing a picture of a present scene in real time via the camera by the electronic device 10. The preview image may be displayed on a display screen of the electronic device 10 in real time, or may be detected by a processor in the electronic device 10. Specifically, the camera in the electronic device 10 performs correction on the preview image according to the target parameter, so that the corrected preview image may be more consistent with the real environment information. When the temperature of the camera module 110 changes, the position of a main point of the camera and the focal length are affected, so that there is a deviation between the image captured by the camera according to the initial calibration parameter and the real environmental information, thereby affecting accuracy of the depth image detection or resulting in a parallax between an infrared image and an RGB image.

According to the image processing method in the embodiment of the disclosure, the temperature of the light emitter is detected, when a temperature difference between a present temperature of the light emitter and an initial temperature exceeds a threshold, a corresponding target parameter is acquired according to the initial temperature and the temperature difference, and a camera corrects a preview image according to the target parameter. Therefore, the influence on the detection accuracy of the depth image due to temperature or a parallax between an infrared image and an RGB image can be avoided, and the deviation between the image and the real environment information can be reduced.

In one embodiment, after acquiring the corresponding target parameter according to the initial temperature and the temperature difference, the image processing method of the disclosure further includes the following operation. The initial temperature is updated according to the present temperature of the light emitter.

Specifically, the electronic device 10 may adopt the present temperature of the light emitter as the initial temperature after acquiring the corresponding target parameter according to the initial temperature and the temperature difference, to update the initial temperature. Thus, the electronic device 10 may continuously detect the temperature of the light emitter, when the temperature difference between the present temperature of the light emitter and the updated initial temperature exceeds the threshold, a target parameter corresponding to the updated initial temperature and the temperature difference is acquired to correct the preview image, thereby reducing the deviation of captured image.

Figure 4:
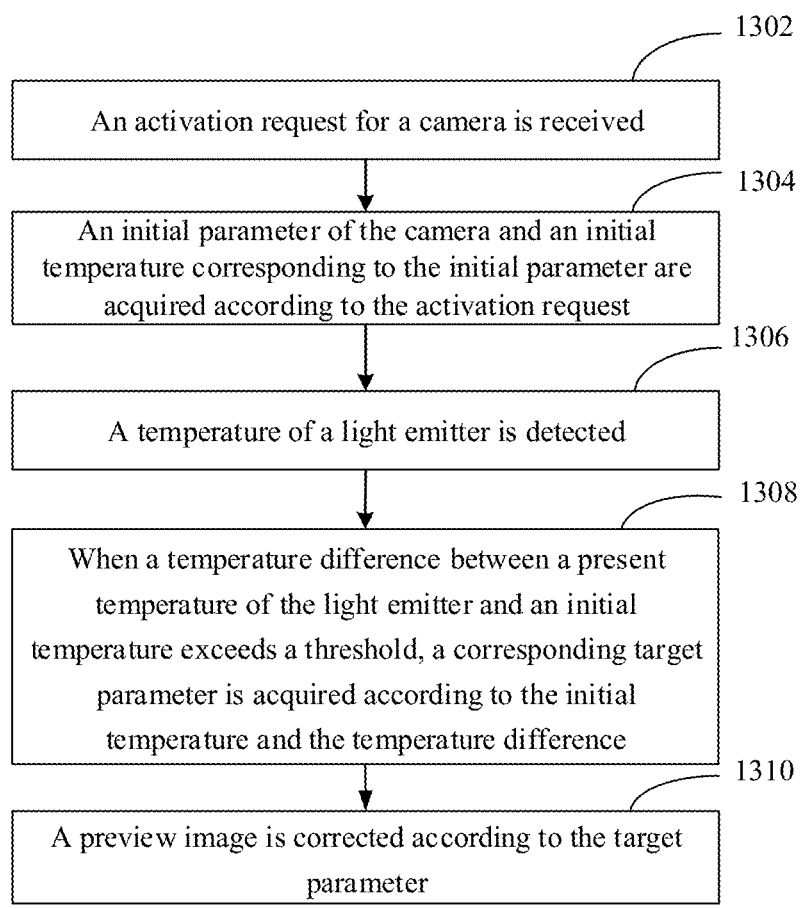

As illustrated in FIG. 4, in one embodiment, the image processing method of the disclosure includes operations in 1302 to 1310.

In 1302, an activation request for a camera is received.

The camera may include a front camera and a rear camera. Specifically, the camera may also be a dual camera. The activation request for the camera may be generated through clicking a button on the display screen by a user, or may be generated through pressing a control on the electronic device 10 or a touch screen by the user. The electronic device 10 may receive the activation request for the camera.

In 1304, an initial parameter of the camera and an initial temperature corresponding to the initial parameter are acquired according to the activation request.

The initial parameter of the camera may be a calibration parameter used for the pervious image capturing of the camera. In one embodiment, the camera is configured with different calibration parameters according to the temperatures or temperature values for determining the calibration parameters at the factory. When the electronic device acquires an initial parameter of the camera according to the activation request, a corresponding initial temperature may be acquired according to the initial parameter. The electronic device 10 may also acquire an initial temperature of the camera according to the activation request, acquire a calibration parameter of the camera as an initial parameter of the camera according to the initial temperature, and acquire the initial parameter.

In 1306, a temperature of a light emitter is detected.

In 1308, when a temperature difference between a present temperature of the light emitter and the initial temperature exceeds a threshold, a corresponding target parameter is acquired according to the initial temperature and the temperature difference.

In 1310, a preview image is corrected according to the target parameter.

The electronic device 10 may receive an activation request for the camera, acquire an initial parameter of the camera and an initial temperature corresponding to the initial parameter according to the activation request, detect the temperature of the light emitter, acquire, when a temperature difference between the present temperature of the light emitter and the initial temperature exceeds a threshold, a target parameter corresponding to the initial temperature and the temperature difference, and perform correction on a preview image. The temperature can be detected when the camera is enabled to acquire the corresponding target parameter and perform correction on the preview image, and thus the deviation of the captured image due to the temperature change can be reduced.

Figure 5:
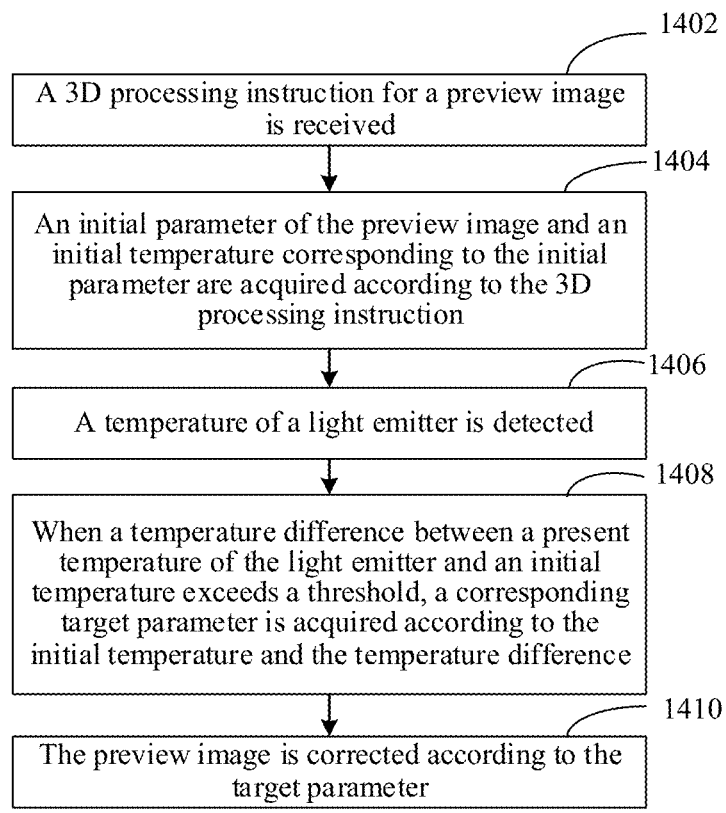

As illustrated in FIG. 5, in one embodiment, the image processing method of the disclosure may include operations in 1402 to 1410.

In 1402, a 3D processing instruction for the preview image is received.

The 3D (3 Dimensions) processing instruction may be generated through clicking a button on a display screen by a user, or may be generated through pressing a control on a touch screen by the user, and the electronic device 10 may acquire the 3D processing instruction for the preview image. 3D processing refers to processing of three dimensions (i.e., length, width, and height) of an image. Specifically, the electronic device 10 may perform 3D processing on an image by detecting depth information of an object or a face in the image via a depth image or an infrared image. For example, the 3D processing may be to perform facial beauty processing on the image, and the electronic device 10 may determine an area where facial beauty processing is required according to the depth information of the face, so as to provide a better facial beauty effect of the image. The 3D processing may also be 3D face modeling, that is, establishing a corresponding 3D face model or the like according to the face in the image. The electronic device 10 may receive the 3D processing instruction for the preview image. After receiving the 3D processing instruction for the preview image, the electronic device 10 performs corresponding 3D processing on the preview image.

In 1404, an initial parameter of the preview image and an initial temperature corresponding to the initial parameter are acquired according to the 3D processing instruction.

The electronic device 10 may acquire an initial parameter corresponding to the preview image according to the 3D processing instruction, and acquire an initial temperature corresponding to the initial parameter. The initial parameter is a calibration parameter used for capturing the preview image by the camera.

In 1406, a temperature of a light emitter is detected.

In 1408, when a temperature difference between a present temperature of the light emitter and the initial temperature exceeds a threshold, a corresponding target parameter is acquired according to the initial temperature and the temperature difference.

In 1410, the preview image is corrected according to the target parameter.

The electronic device 10 may receive a 3D processing instruction for a preview image, acquire an initial parameter corresponding to the preview image and an initial temperature corresponding to the initial parameter according to the 3D processing instruction, detect the temperature of the light emitter, and acquire, when the temperature difference between the present temperature of the light emitter and the initial temperature exceeds a threshold, a corresponding target parameter according to the initial temperature and the temperature difference to correct the preview image. When 3D processing is performed on an image, the temperature may be detected to acquire a corresponding target parameter to correct the preview image, and then corresponding 3D processing is performed on the corrected image according to a 3D processing instruction, such that the deviation of the captured image can be reduced, and the accuracy of 3D processing can be improved.

Figure 6:
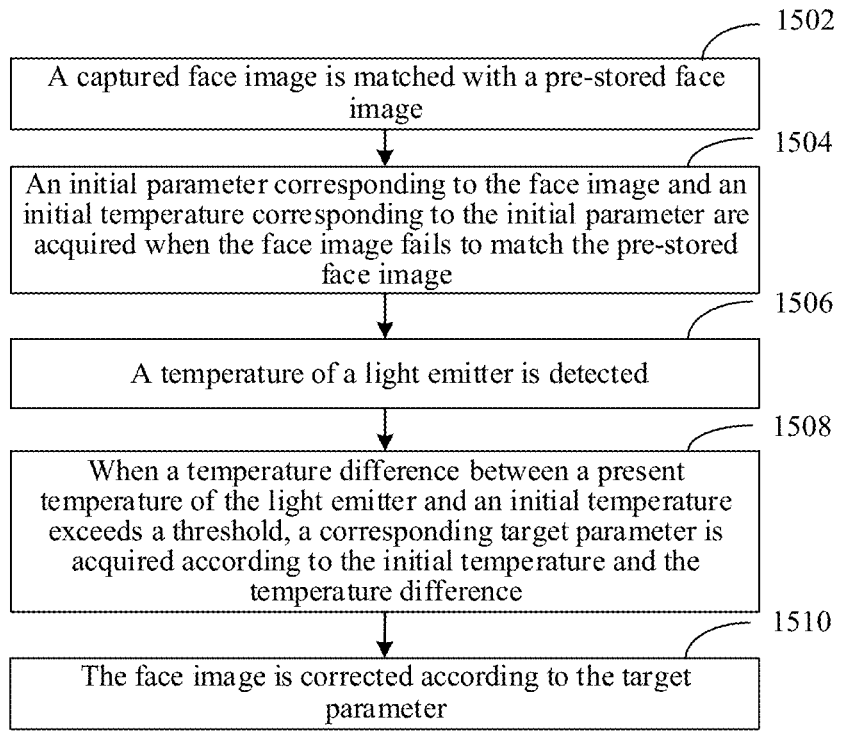

As illustrated in FIG. 6, in one embodiment, the image processing method of the disclosure may include operations in 1502 to 1510.

In 1502, a captured face image is matched with a pre-stored face image.

The pre-stored face image refers to a face preset by the electronic device 10, and the pre-stored face image is usually a face image of a holder of the electronic device 10, or a face image of another user who is allowed to operate the electronic device 10 by the holder. There may be one or more pre-stored face images, and the electronic device 10 may set respective pre-stored face images for different application scenes. The electronic device 10 may capture a face image in an application scene such as face unlocking or face payment, acquire a pre-stored face image corresponding to the application scene, and match the captured face image with the pre-stored face image.

In 1504, an initial parameter corresponding to the face image and an initial temperature corresponding to the initial parameter are acquired when the face image is not matched with the pre-stored face image.

The electronic device 10 may set a matching threshold, and when the matching degree between the face image and the pre-stored face image is lower than the matching threshold, it is determined that the matching fails. The electronic device 10 may acquire an initial parameter corresponding to the face image and an initial temperature corresponding to the initial parameter responsive to failure in matching of the face image and all the pre-stored face images. The electronic device 10 analyzes the matching degree of the face image and each pre-stored face image when the face image fails to match the pre-stored face images. For example, the electronic device 10 may acquire an initial parameter corresponding to the face image and an initial temperature corresponding to the initial parameter when a difference between the matching degree of the face image and one pre-stored face image and the matching degree of the face image and other pre-stored face images exceeds a preset value. For example, when the matching threshold is 80% and the preset value is 30%, if there are pre-stored face images A, B and C, the matching degrees between a face image D and the pre-stored face images A, B and C are 75%, 40% and 25%, respectively, so the difference between the matching degree of the face images D and A and the matching degree of D and B as well as the difference between the matching degree of the face images D and A and the matching degree of D and C exceeds the preset value of 30%. The electronic device 10 determines that the difference between the matching degree of the face image D and the pre-stored face image A and the matching threshold may be caused by the deviation of the captured face image, and then acquires an initial parameter corresponding to the face image and an initial temperature corresponding to the initial parameter.

In 1506, a temperature of a light emitter is detected.

In 1508, when a temperature difference between a present temperature of the light emitter and the initial temperature exceeds a threshold, a corresponding target parameter is acquired according to the initial temperature and the temperature difference.

In 1510, the face image is corrected according to the target parameter.

The electronic device 10 may correct the face image according to the target parameter, and match the corrected face image with the pre-stored face image. Since the temperature of the light emitter is detected during face authentication, when the temperature difference between the present temperature of the light emitter and the initial temperature exceeds the threshold, the corresponding target parameter is acquired according to the initial temperature and the temperature difference, and the face image is corrected, so that the electronic device matches the corrected face image with the pre-stored face image. Therefore, the deviation of the captured face image can be reduced, and the accuracy of face matching is improved.

In one embodiment, in the image processing method of the disclosure, the procedure of acquiring an initial parameter corresponding to the face image and an initial temperature corresponding to the initial parameter when the face image is not matched with the pre-stored face image further includes the following operation. The initial parameter corresponding to the face image and the initial temperature corresponding to the initial parameter are acquired when the number of times of failure in matching of the face image and the pre-stored face image exceeds a preset number of times.

The preset number of times may be set according to actual application requirements, and is not limited herein. For example, the preset number of times may be 2, 3, 4, 5, etc., and is not limited thereto. When the number of times of failure in matching of the face image and the pre-stored face image exceeds the preset number of times, the electronic device 10 may acquire an initial parameter corresponding to the face image and an initial temperature corresponding to the initial parameter, detect the temperature of the light emitter, acquire the corresponding target parameter according to the initial temperature and the temperature difference when the temperature difference between the present temperature of the light emitter and the initial temperature exceeds a threshold, and correct the face image according to the target parameter, so that the electronic device 10 may match the corrected face image with the pre-stored face image. Therefore, the deviation of the captured face image caused by the temperature can be avoided, and the accuracy of face matching is improved.

Figure 7:
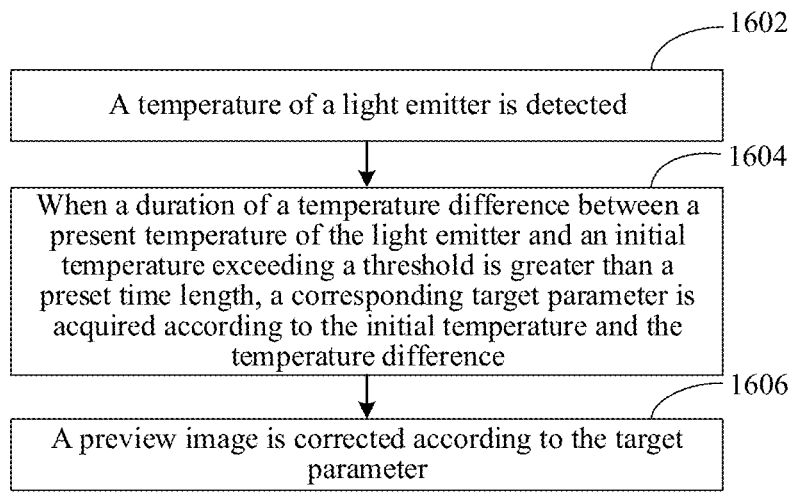

As illustrated in FIG. 7, in one embodiment, the image processing method of the disclosure may include operations in 1602 to 1606.

In 1602, a temperature of a light emitter is detected.

In 1604, when the duration in which a temperature difference between a present temperature of the light emitter and an initial temperature exceeds a threshold is greater than a preset time length, a corresponding target parameter is acquired according to the initial temperature and the temperature difference.

The preset time length may be set according to actual application requirements. For example, the preset time length may be 3 seconds, 4 seconds, 5 seconds, etc., and is limited thereto. When the duration in which the temperature difference between the present temperature of the light emitter and the initial temperature exceeds the threshold is greater than the preset time length, specifically, the electronic device 10 may acquire an average value of the temperature differences within the preset time length together with the initial temperature to acquire a corresponding target parameter. The electronic device 10 may also acquire the temperature difference occurring most frequently within the preset time length together with the initial temperature to acquire a corresponding target parameter. The electronic device 10 may also acquire the last temperature difference within the preset time length together with the initial temperature to acquire a corresponding target parameter. For example, when the initial temperature is 20 degrees and the threshold is 3 degrees, if the electronic device 10 detects that changes of the present temperature of the light emitter within the preset time length are 23 degrees, 24 degrees, 25 degrees, 25 degrees, 25 degrees, 24 degrees and 26 degrees, the electronic device 10 may acquire a corresponding target parameter according to the temperature difference occurring most frequently, that is, 5 degrees and the initial temperature of 20 degrees, or may also acquire a corresponding target parameter according to an average value of the temperature difference, that is, 4.6 degrees and the initial temperature of 20 degrees, and may also acquire a corresponding target parameter according to the last temperature difference within the preset time length, that is, 6 degrees and the initial temperature of 20 degrees. When the duration in which the temperature difference between the present temperature and the initial temperature of the light emitter exceeds the threshold is greater than the preset time length, there may be various manners that the electronic device 10 acquires a corresponding target parameter according to the initial temperature and the temperature difference, which may be specifically set according to the actual application requirements and are not limited herein.

In 1606, a preview image is corrected according to the target parameter.

The electronic device 10 detects the temperature of the light emitter. When the duration of a temperature difference between the present temperature and the initial temperature of the light emitter exceeding the threshold is greater than a preset time length, the corresponding target parameter is acquired according to the initial temperature and the temperature difference, and the preview image is corrected, such that the deviation of the captured image can be reduced.

Figure 8:
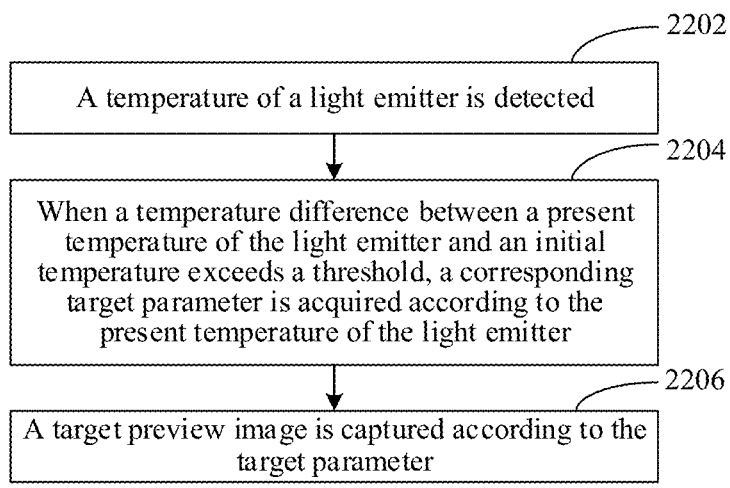

As illustrated in FIG. 8, in one embodiment, the image processing method of the disclosure includes operations in 2202 to 2206.

The operation in 202 includes the following action. In 2202, the temperature of the light emitter is detected.

The light emitter refers to a device for generating light in the camera module 110 of the electronic device 10. Specifically, the light emitter may include a floodlight 114 and a laser light 118 in FIG. 1. The electronic device 10 may detect the temperature of the light emitter by a built-in temperature sensor. Specifically, the electronic device 10 may preset a time interval, detect the temperature of the light emitter every preset time interval, or continuously detect the temperature of the light emitter, and may also detect the temperature of the light emitter when the service time of the light emitter is greater than a preset time length.

The operation in 204 includes the following action. In 2204, when the temperature difference between the present temperature of the light emitter and the initial temperature exceeds the threshold, a corresponding target parameter is acquired according to the present temperature of the light emitter.

The present temperature of the light emitter refers to the temperature of the light emitter detected by the electronic device 10 in real time. The initial temperature may be the temperature of the light emitter when the light emitter is enabled, or may be the temperature corresponding to one or more calibration parameters used when a camera captures an image. The calibration parameter refers to a parameter for determining a correspondence between a three-dimensional geometric position of a point on a surface of an object in space and its corresponding point in the image. Each camera is configured with the corresponding calibration parameter at the factory. The calibration parameter includes an internal parameter, an external parameter, and a distortion parameter. The threshold may be set according to the requirements of the actual application. For example, when measured using Celsius, the threshold may be 3 degrees, 4 degrees, 5 degrees, 6 degrees, or the like, and is not limited thereto. The target parameter refers to a calibration parameter of the camera. Specifically, the target parameter includes at least one of an internal parameter, an external parameter or a distortion parameter. The camera may be a single camera or a dual camera. When the camera is a dual camera, the electronic device 10 may acquire target parameters corresponding to the two cameras respectively. For example, the camera may be at least one of the RGB camera 116 or the laser camera 112.

The electronic device 10 may preset camera calibration parameters corresponding to different temperatures. Specifically, the electronic device 10 may pre-store different calibration parameters for different temperatures, or may pre-store calibration parameters corresponding to different temperature gradients by using any temperature value as a gradient, that is, different calibration parameters are pre-stored for different temperature ranges. For example, the electronic device may set a set of calibration parameters every 5 degrees by taking 0 degree as a reference, and the calibration parameters corresponding to the temperature ranges of 0-5 degrees, 5-10 degrees and 10-15 degrees are different. When the temperature difference between the present temperature of the light emitter and the initial temperature exceeds the threshold, the electronic device may search and obtain the corresponding target parameter according to the present temperature of the light emitter.

The operation 206 includes the following action. In 2206, a target preview image is captured according to the target parameter.

The target preview image is generated through capturing a picture of a present scene in real time via the camera by the electronic device 10. The target preview image may be displayed on a display screen of the electronic device 10 in real time, or may be detected by a processor in the electronic device 10. Specifically, the camera in the electronic device 10 captures a target preview image according to the target parameter. When the temperature of the camera module 110 changes, the position of a main point of the camera and the focal length are affected, so that there is a deviation between the image captured by the camera according to the initial calibration parameter and the real environmental information, thereby affecting the accuracy of the depth image detection or resulting in a parallax between an infrared image and an RGB image.

According to the image processing method in the embodiment of the disclosure, the temperature of the light emitter is detected, when a temperature difference between a present temperature of the light emitter and an initial temperature exceeds a threshold, a corresponding target parameter is acquired according to the present temperature of the light emitter, and a camera captures a target preview image according to the target parameter. Therefore, the influence on the detection accuracy of the depth image due to temperature or the parallax between an infrared image and an RGB image can be avoided, and the deviation between the image and the real environment information can be reduced.

In one embodiment, after acquiring the corresponding target parameter according to the present temperature of the light emitter, the image processing method of the disclosure further includes the following operation. The initial temperature is updated according to the present temperature of the light emitter.

Specifically, the electronic device 10 may adopt the present temperature of the light emitter as the initial temperature after acquiring the corresponding target parameter according to the present temperature of the light emitter, to update the initial temperature. Thus, the electronic device 10 may continuously detect the temperature of the light emitter, when the temperature difference between the present temperature of the light emitter and the updated initial temperature exceeds the threshold, a target parameter corresponding to the present temperature is acquired to capture the target preview image, thereby reducing the deviation of captured image.

Figure 9:
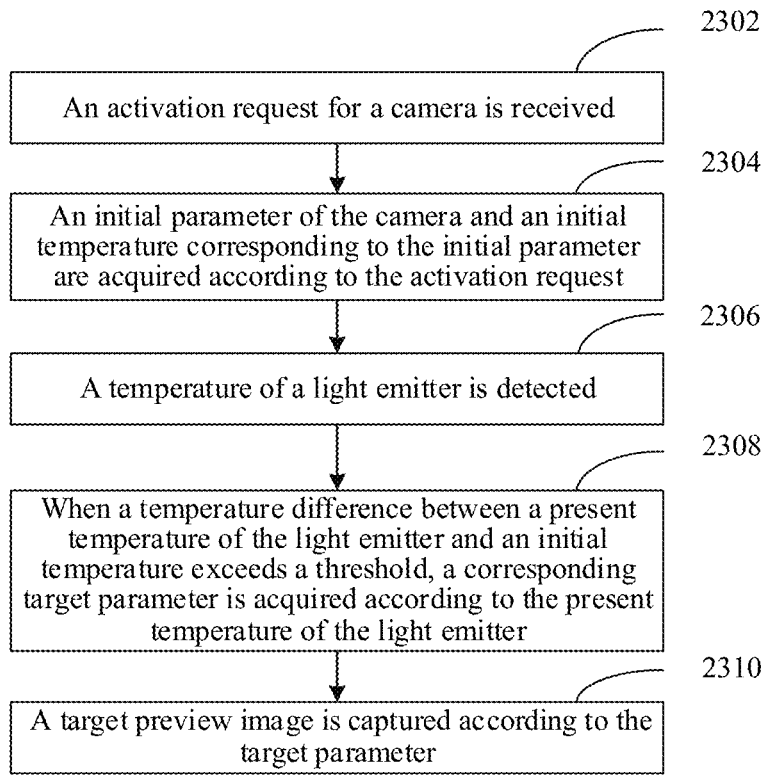

As illustrated in FIG. 9, in one embodiment, the image processing method of the disclosure includes operations in 2302 to 2310.

In 2302, an activation request for a camera is received.

The camera may include a front camera and a rear camera. Specifically, the camera may also be a dual camera. The activation request for the camera may be generated through clicking a button on the display screen by a user, or may be generated through pressing a control on the electronic device 10 or a touch screen by the user. The electronic device may receive the activation request for the camera.

In 2304, an initial parameter of the camera and an initial temperature corresponding to the initial parameter are acquired according to the activation request.

The initial parameter of the camera may be a calibration parameter used for the pervious image capturing of the camera. In one embodiment, the camera is configured with different calibration parameters according to the temperatures or temperature values for determining the calibration parameters at the factory. When the electronic device 10 acquires an initial parameter of the camera according to the activation request, a corresponding initial temperature may be acquired according to the initial parameter. The electronic device 10 may also acquire an initial temperature of the camera according to the activation request, acquire a calibration parameter of the camera as an initial parameter of the camera according to the initial temperature, and acquire the initial temperature.

In 2306, a temperature of a light emitter is detected.

In 2308, when a temperature difference between the present temperature of the light emitter and the initial temperature exceeds the threshold, a corresponding target parameter is acquired according to the present temperature of the light emitter.

In 2310, a target preview image is captured according to the target parameter.

The electronic device 10 may receive an activation request for the camera, acquire an initial parameter of the camera and an initial temperature corresponding to the initial parameter according to the activation request, detect the temperature of the light emitter, acquire, when a temperature difference between the present temperature of the light emitter and the initial temperature exceeds a threshold, a target parameter corresponding to the present temperature, and capture a target preview image according to the target parameter. The temperature can be detected when the camera is enabled to acquire the corresponding target parameter and the target preview image is captured according to the target parameter, and thus the deviation of the captured image due to the temperature change can be reduced.

Figure 10:
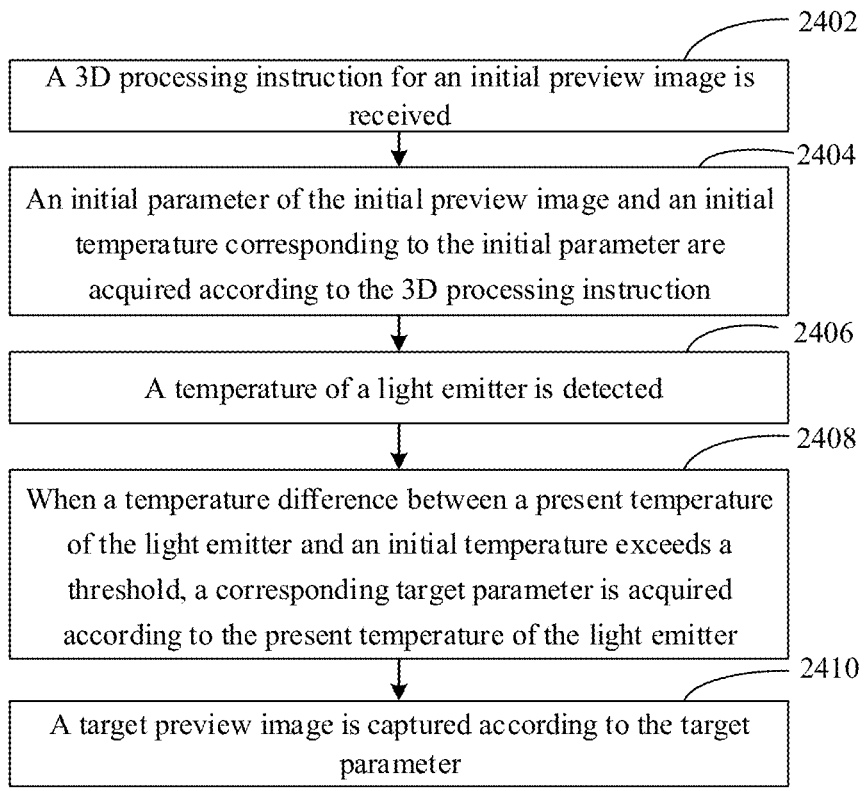

As illustrated in FIG. 10, in one embodiment, the image processing method of the disclosure may include operations in 2402 to 2410.

In 2402, a 3D processing instruction for an initial preview image is received.

The 3D (3 Dimensions) processing instruction may be generated through clicking a button on a display screen by a user, or may be generated through pressing a control on a touch screen by the user, and the electronic device 10 may acquire the 3D processing instruction for the initial preview image. 3D processing refers to processing of three dimensions (i.e., length, width, and height) of an image. Specifically, the electronic device 10 may perform 3D processing on an image by detecting depth information of an object or a face in the image via a depth image or an infrared image. For example, the 3D processing may be to perform facial beauty processing on the image, and the electronic device 10 may determine an area where facial beauty processing is required according to the depth information of the face, so as to provide a better facial beauty effect of the image. The 3D processing may also be 3D face modeling, that is, establishing a corresponding 3D face model or the like according to the face in the image. The electronic device 10 may receive the 3D processing instruction for the initial preview image. The initial preview image refers to an image of surrounding environment information captured by the electronic device 10 through the camera, and the initial preview image is displayed on the display screen of the electronic device 10 in real time. After receiving the 3D processing instruction for the initial preview image, the electronic device 10 performs corresponding 3D processing on the initial preview image.

In 2404, an initial parameter corresponding to the initial preview image and an initial temperature corresponding to the initial parameter are acquired according to the 3D processing instruction.

The electronic device 10 may acquire an initial parameter corresponding to the initial preview image according to the 3D processing instruction, and acquire an initial temperature corresponding to the initial parameter. The initial parameter is a calibration parameter used for capturing the initial preview image by the camera.

In 2406, a temperature of a light emitter is detected.

In 2408, when a temperature difference between the present temperature of the light emitter and the initial temperature exceeds a threshold, a corresponding target parameter is acquired according to the present temperature of the light emitter.

In 2410, a target preview image is captured according to the target parameter.

The electronic device 10 may receive a 3D processing instruction for an initial preview image, acquire an initial parameter corresponding to the initial preview image and an initial temperature corresponding to the initial parameter according to the 3D processing instruction, detect the temperature of the light emitter, and acquire, when the temperature difference between the present temperature of the light emitter and the initial temperature exceeds a threshold, a corresponding target parameter according to the present temperature of the light emitter to capture a target preview image. When 3D processing is performed on an image, the temperature may be detected to acquire a corresponding target parameter to capture a target preview image, and then the image is processed, such that the deviation of the captured image can be reduced, and the accuracy of 3D processing can be improved.

Figure 11:
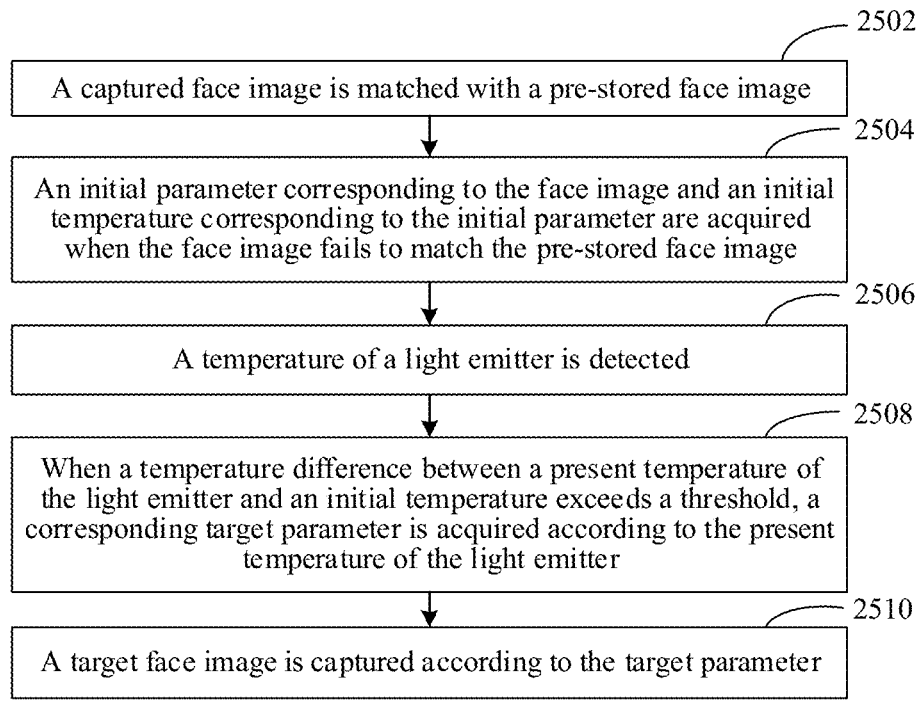

As illustrated in FIG. 11, in one embodiment, the image processing method of the disclosure may include operations in 2502 to 2510.

In 2502, a captured face image is matched with a pre-stored face image.

The pre-stored face image refers to a face preset by the electronic device 10, and the pre-stored face image is usually a face image of a holder of the electronic device 10, or a face image of another user who is allowed to operate the electronic device 10 by the holder. There may be one or more pre-stored face images, and the electronic device 10 may set respective pre-stored face images for different application scenes. The electronic device 10 may capture a face image in an application scene such as face unlocking or face payment, acquire a pre-stored face image corresponding to the application scene, and match the captured face image with the pre-stored face image.

In 2504, an initial parameter corresponding to the face image and an initial temperature corresponding to the initial parameter are acquired when the face image is not matched with the pre-stored face image.

The electronic device 10 may set a matching threshold, and when the matching degree between the face image and the pre-stored face image is lower than the matching threshold, it is determined that the matching fails. The electronic device 10 may acquire an initial parameter corresponding to the face image and an initial temperature corresponding to the initial parameter responsive to failure in matching of the face image and all the pre-stored face images. The electronic device 10 analyzes the matching degree of the face image and each pre-stored face image when the face image fails to match all the pre-stored face images. For example, the electronic device 10 may acquire an initial parameter corresponding to the face image and an initial temperature corresponding to the initial parameter when a difference between the matching degree of the face image and one pre-stored face image and the matching degree of the face image and other pre-stored face images exceeds a preset value. For example, when the matching threshold is 80% and the preset value is 30%, if there are pre-stored face images A, B and C, the matching degrees between a face image D and the pre-stored face images A, B and C are 75%, 40% and 25%, respectively, so the difference between the matching degree of the face images D and A and the matching degree of D and B as well as the difference between the matching degree of the face images D and A and the matching degree of D and C exceeds the preset value of 30%. The electronic device 10 determines that the difference between the matching degree of the face image D and the pre-stored face image A and the matching threshold may be caused by the deviation of the captured face image, and then acquires an initial parameter corresponding to the face image and an initial temperature corresponding to the initial parameter.

In 2506, a temperature of a light emitter is detected.

In 2508, when a temperature difference between the present temperature of the light emitter and the initial temperature exceeds a threshold, a corresponding target parameter is acquired according to the present temperature of the light emitter.

In 2510, a target face image is captured according to the target parameter.

The target face image refers to a face image captured according to the target parameter that is acquired by the electronic device 10 according to the present temperature. The electronic device 10 may capture the target face image according to the target parameter, and match the target face image with the pre-stored face image. Since the target parameter may be acquired according to the present temperature to capture the target face image for matching, the deviation of the captured face image can be reduced, and the accuracy of face matching can be improved.

In one embodiment of the provided image processing method, the procedure of acquiring an initial parameter corresponding to the face image and an initial temperature corresponding to the initial parameter when the face image is not matched with the pre-stored face image further includes the following operation. The initial parameter corresponding to the face image and an initial temperature corresponding to the initial parameter are acquired when the number of times of failure in matching of the face image and the pre-stored face image exceeds a preset number of times.

The preset number of times may be set according to actual application requirements, and is not limited herein. For example, the preset number of times may be 2, 3, 4, 5, etc., and is not limited thereto. When the number of times of failure in matching of the face image and the pre-stored face image exceeds the preset number of times, the electronic device 10 may acquire an initial parameter corresponding to the face image and an initial temperature corresponding to the initial parameter, detect the temperature of the light emitter, acquire the target parameter corresponding to the present temperature of the light emitter when the temperature difference between the present temperature of the light emitter and the initial temperature exceeds a threshold, and capture the target face image according to the target parameter, so that the electronic device 10 may match the target face image with the pre-stored face image. Since the target face image is captured according to the target parameter corresponding to the present temperature, the deviation of the captured face image caused by the temperature can be avoided, and the accuracy of face matching is improved.

Figure 12:
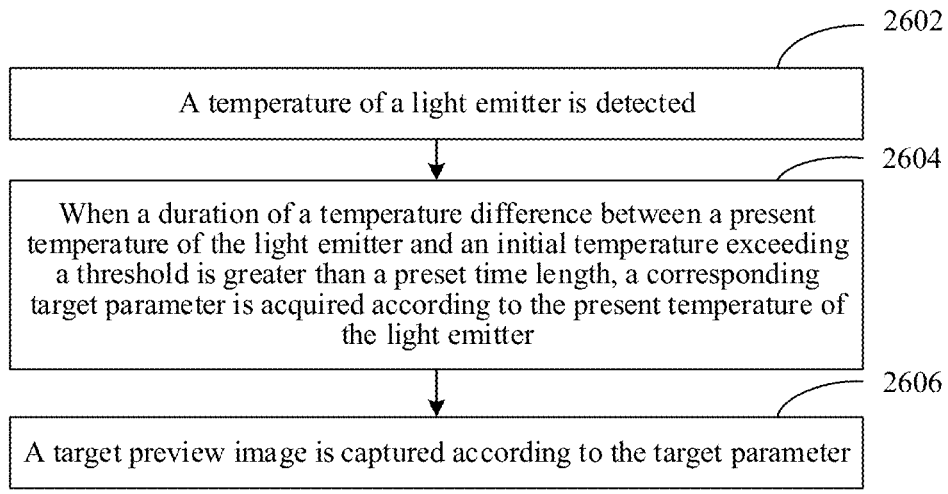

As illustrated in FIG. 12, in one embodiment, the image processing method of the disclosure may include operations in 2602 to 2606.

In 2602, a temperature of a light emitter is detected.

In 2604, when the duration in which a temperature difference between a present temperature of the light emitter and an initial temperature exceeds a threshold is greater than a preset time length, a corresponding target parameter is acquired according to the present temperature of the light emitter.

The preset time length may be set according to actual application requirements. For example, the preset time length may be 3 seconds, 4 seconds, 5 seconds, etc., and is limited thereto. When the duration in which the temperature difference between the present temperature of the light emitter and the initial temperature exceeds the threshold is greater than the preset time length, specifically, the electronic device 10 may acquire an average temperature value within the preset time length as the present temperature to acquire a corresponding target parameter. The electronic device 10 may also acquire a temperature value occurring most frequently within the preset time length as the present temperature to acquire a corresponding target parameter. The electronic device 10 may also acquire the last temperature value within the preset time length as the present temperature to acquire a corresponding target parameter. For example, when the initial temperature of the light emitter is 20 degrees and the threshold is 3 degrees, if the electronic device 10 detects that changes of the present temperature of the light emitter within the preset time length are 23 degrees, 24 degrees, 25 degrees, 25 degrees, 25 degrees, 24 degrees or 26 degrees, the electronic device 10 may determine the temperature value occurring most frequently, that is, 25 degrees as the present temperature to acquire a corresponding target parameter, or may also determine an average temperature value, that is, 24.6 degrees as the present temperature to acquire a corresponding target parameter, and may also determine the last temperature value within the preset time length, that is, 26 degrees as the present temperature to acquire a corresponding target parameter. When the duration in which the temperature difference between the present temperature of the light emitter and the initial temperature exceeding the threshold is greater than the preset time length, there may be various manners that the electronic device 10 acquires a corresponding target parameter according to the present temperature of the light emitter, which may be specifically set according to the actual application requirements and are not limited herein.

In 2606, a target preview image is captured according to the target parameter.

The electronic device 10 detects the temperature of the light emitter, acquires, when the duration of the temperature difference between the present temperature of the light emitter and the initial temperature exceeding the threshold is greater than the preset time length, a target parameter corresponding to the present temperature of the light emitter, and captures the target preview image according to the target parameter. Therefore, the deviation of the captured image can be reduced.

It is to be understood that although various operations of the flowchart in FIG. 2 to FIG. 12 are illustrated in sequence according to the indication of an arrow, these operations are not necessarily performed in the sequence indicated by the arrow. Unless explicitly stated herein, there is no strict sequence limitation to these operations, which may be performed in other sequences. Further, at least some operations in FIG. 2 to FIG. 12 may include multiple sub-operations or multiple stages, these sub-operations or stages are not necessarily completed at the same moment but may be performed at different moments, and these sub-operations or stages are not necessarily performed in a sequence but may be performed in turns or alternately with at least part of other operations or sub-operations or stages of the other operations.

Figure 13:
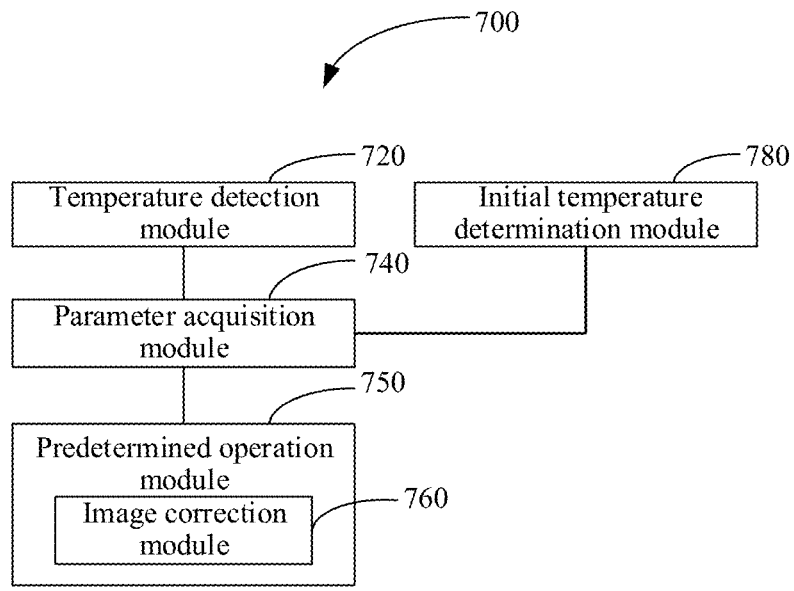
FIG. 13 and FIG. 14 illustrate a structure block diagram of an image processing apparatus according to some embodiments of the disclosure.

FIG. 13 is a structure block diagram of an image processing apparatus 700 in one embodiment. As illustrated in FIG. 7, the image processing apparatus 700 includes a temperature detection module 720, a parameter acquisition module 740 and a predetermined operation module 750.

The temperature detection module 720 is configured to detect a temperature of a light emitter.

The parameter acquisition module 740 is configured to acquire a target parameter responsive to determining that a temperature difference between a present temperature of the light emitter and an initial temperature exceeds a threshold.

The predetermined operation module 750 is configured to perform a predetermined operation according to the target parameter. As illustrated in FIG. 13, in one embodiment, the predetermined operation module 750 includes an image correction module 760.

The temperature detection module 720 is configured to detect the temperature of the light emitter.

The parameter acquisition module 740 is configured to acquire, when a temperature difference between a present temperature of the light emitter and the initial temperature exceeds the threshold, a corresponding target parameter according to the initial temperature and the temperature difference.

The image correction module 760 is configured to perform correction on a preview image according to the target parameter.

In one embodiment, as illustrated in FIG. 13, the image processing apparatus 700 of the disclosure may further include an initial temperature determination module 780. The initial temperature determination module 780 is configured to update the initial temperature according to the present temperature of the light emitter.

In one embodiment, the initial temperature determination module 780 may be further configured to receive an activation request for a camera, and acquire an initial parameter of the camera and an initial temperature corresponding to the initial parameter according to the activation request.

In one embodiment, the initial temperature determination module 780 may be further configured to receive a 3D processing instruction for a preview image, and acquire an initial parameter corresponding to the preview image and an initial temperature corresponding to the initial parameter according to the 3D processing instruction.

In one embodiment, the initial temperature determination module 780 may be further configured to match a captured face image with a pre-stored face image, and acquire an initial parameter corresponding to the face image and an initial temperature corresponding to the initial parameter when the face image fails to match the pre-stored face image. The image correction module 760 may be further configured to correct the face image according to the target parameter.

In one embodiment, the initial temperature determination module 780 may be further configured to acquire an initial parameter corresponding to the face image and an initial temperature corresponding to the initial parameter when the number of times of failure in matching of the face image and the pre-stored face image exceeds a preset number of times.

In one embodiment, the parameter acquisition module 740 may be further configured to acquire, when the duration of a temperature difference between the present temperature of the light emitter and the initial temperature exceeding the threshold is greater than a preset time length, the corresponding target parameter according to the initial temperature and the temperature difference.

The image processing apparatus 700 illustrated in FIG. 13 may detect the temperature of the light emitter, acquire, when a temperature difference between the present temperature of the light emitter and the initial temperature exceeds the threshold, the corresponding target parameter according to the initial temperature and the temperature difference, and process the preview image according to the target parameter. Therefore, the deviation of the image can be reduced.

Figure 14:
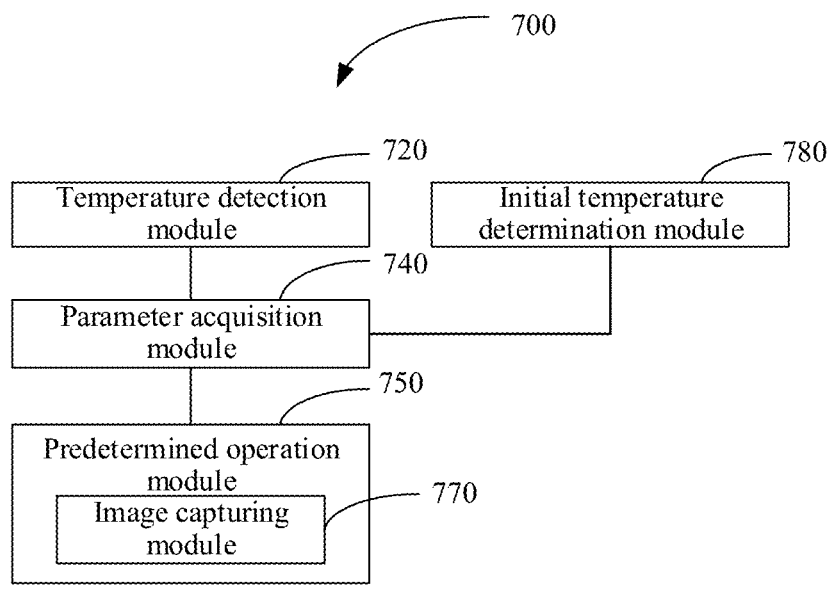

As illustrated in FIG. 14, in one embodiment, the predetermined operation module 750 includes an image capturing module 770.

The temperature detection module 720 is configured to detect a temperature of a light emitter.

The parameter acquisition module 740 is configured to acquire, when a temperature difference between a present temperature of the light emitter and an initial temperature exceeds a threshold, a corresponding target parameter according to the present temperature of the light emitter.

The image capturing module 770 is configured to capture a target preview image according to the target parameter.

In one embodiment, as illustrated in FIG. 14, the image processing apparatus 700 of the disclosure may further include an initial temperature determination module 780. The initial temperature determination module 780 is configured to update the initial temperature according to the present temperature of the light emitter.

In one embodiment, the initial temperature determination module 780 may be further configured to receive an activation request for a camera, and acquire an initial parameter of the camera and an initial temperature corresponding to the initial parameter according to the activation request.

In one embodiment, the initial temperature determination module 780 may be further configured to receive a 3D processing instruction for an initial preview image, and acquire an initial parameter corresponding to the initial preview image and an initial temperature corresponding to the initial parameter according to the 3D processing instruction.

In one embodiment, the initial temperature determination module 780 may be further configured to match a captured face image with one or more pre-stored face images, and acquire an initial parameter corresponding to the face image and an initial temperature corresponding to the initial parameter when the face image fails to match the one or more pre-stored face images. The image capturing module 770 may be further configured to capture a target face image according to the target parameter.

In one embodiment, the initial temperature determination module 780 may be further configured to acquire an initial parameter corresponding to the face image and an initial temperature corresponding to the initial parameter when the number of times of failure in matching of the face image and the pre-stored face images exceeds a preset number of times.

In one embodiment, the parameter acquisition module 740 may be further configured to acquire, when the duration of a temperature difference between the present temperature of the light emitter and the initial temperature exceeding the threshold is greater than a preset time length, a corresponding target parameter according to the present temperature of the light emitter.

The image processing apparatus 700 illustrated in FIG. 14 may detect the temperature of the light emitter, acquire, when a temperature difference between the present temperature of the light emitter and the initial temperature exceeds the threshold, the corresponding target parameter according to the present temperature of the light emitter, and capture a target preview image according to the target parameter. Therefore, the deviation of the image can be reduced.

The division of each module in the above image processing apparatus 700 is only for illustration, and in other embodiments, the image processing apparatus 700 may be divided into different modules as required to complete all or some functions of the above image processing apparatus 700.

Specific descriptions of the image processing apparatus 700 may refer to descriptions of the image processing method, and will not be elaborated herein. Various modules in the above image processing apparatus 700 may be totally or partially implemented by software, hardware or a combination thereof. The modules may be embedded into or independent from a processor of a computer device in the form of hardware, and may also be stored in a memory of the computer device in the form of software, such that the processor calls the modules to perform the operation corresponding to each module.

Figure 15:
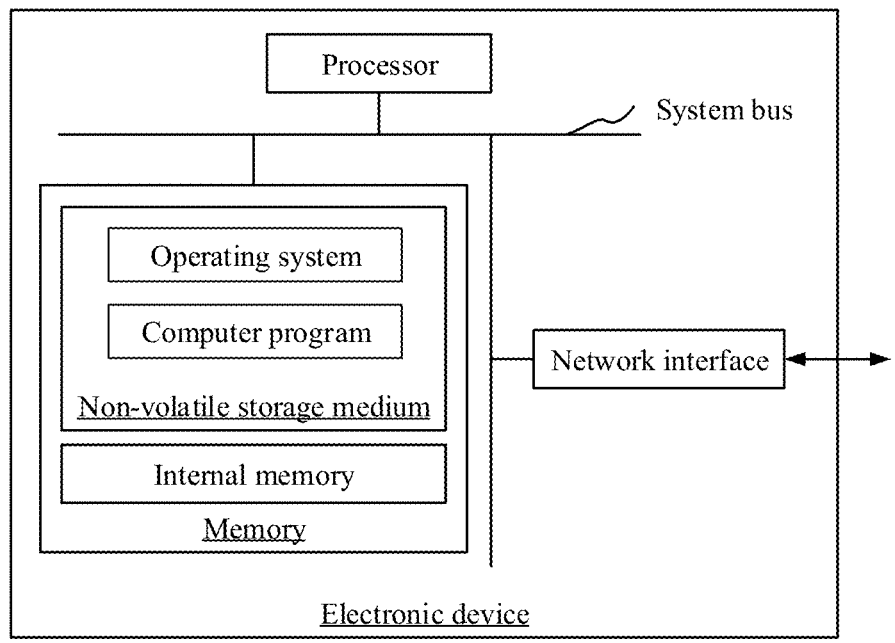
FIG. 15 schematically illustrates a schematic internal structure diagram of an electronic device according to some embodiments of the disclosure.

FIG. 15 is an internal structure diagram of an electronic device 10 (illustrated in FIG. 1) in one embodiment. As illustrated in FIG. 15, the electronic device 10 includes a processor, a memory and a network interface, connected through a system bus. The processor is configured to provide computing and control capabilities for supporting the operation of the entire electronic device 10. The memory is configured to store data, programs or the like. The memory stores at least one computer program, and the computer program may be executed by the processor to implement the image processing method provided in the embodiments of the disclosure and applied to the electronic device 10. The memory may include a non-volatile storage medium and an internal memory. The non-volatile storage medium stores an operating system and a computer program. The computer program may be executed by the processor to implement the image processing method provided in each of the above embodiments. The internal memory provides a cache operation environment for the operating system and the computer program in the non-volatile storage medium. The network interface may be an Ethernet card or a wireless network card for communicating with an external electronic device. The electronic device 10 may be a mobile phone, a tablet, a personal digital assistant, a wearable device or the like.

In one embodiment, the computer program is executed by the processor to enable the processor to perform the following operations. In 202, a temperature of a light emitter is detected. In 204, when a temperature difference between a present temperature of the light emitter and an initial temperature exceeds a threshold, a target parameter is acquired. In 206, a predetermined operation is performed according to the target parameter.

In one embodiment, the computer program is executed by the processor to enable the processor to perform the following operations. In 1202, a temperature of a light emitter is detected. In 1204, when a temperature difference between a present temperature of the light emitter and an initial temperature exceeds a threshold, a corresponding target parameter is acquired according to the initial temperature and the temperature difference. In 1206, a preview image is corrected according to the target parameter.

In one embodiment, the computer program is executed by the processor to enable the processor to perform the following operations. In 1302, an activation request for a camera is received. In 1304, an initial parameter of the camera and an initial temperature corresponding to the initial parameter are acquired according to the activation request. In 1306, a temperature of a light emitter is detected. In 1308, when a temperature difference between a present temperature of the light emitter and an initial temperature exceeds a threshold, a corresponding target parameter is acquired according to the initial temperature and the temperature difference. In 1310, a preview image is corrected according to the target parameter.

In one embodiment, the computer program is executed by the processor to enable the processor to perform the following operations. In 1402, a 3D processing instruction for a preview image is received. In 1404, an initial parameter corresponding to the preview image and an initial temperature corresponding to the initial parameter are acquired according to the 3D processing instruction. In 1406, a temperature of a light emitter is detected. In 1408, when a temperature difference between a present temperature of the light emitter and an initial temperature exceeds a threshold, a corresponding target parameter is acquired according to the initial temperature and the temperature difference. In 1410, the preview image is corrected according to the target parameter.

In one embodiment, the computer program is executed by the processor to enable the processor to perform the following operations. In 1502, a captured face image is matched with a pre-stored face image. In 1504, an initial parameter corresponding to the face image and an initial temperature corresponding to the initial parameter are acquired when the face image fails to match the pre-stored face image. In 1506, a temperature of a light emitter is detected. In 1508, when a temperature difference between a present temperature of the light emitter and an initial temperature exceeds a threshold, a corresponding target parameter is acquired according to the initial temperature and the temperature difference. In 1510, the face image is corrected according to the target parameter.

In one embodiment, the computer program is executed by the processor to enable the processor to perform the following operations. In 1602, a temperature of a light emitter is detected. In 1604, when a duration of a temperature difference between a present temperature of the light emitter and an initial temperature exceeding a threshold is greater than a preset time length, a corresponding target parameter is acquired according to the initial temperature and the temperature difference. In 1606, a preview image is corrected according to the target parameter.

In one embodiment, the computer program is executed by the processor to enable the processor to perform the following operations. In 2202, a temperature of a light emitter is detected. In 2204, when a temperature difference between a present temperature of the light emitter and an initial temperature exceeds a threshold, a corresponding target parameter is acquired according to the present temperature of the light emitter. In 2206, a target preview image is captured according to the target parameter.

In one embodiment, the computer program is executed by the processor to enable the processor to perform the following operations. In 2302, an activation request for a camera is received. In 2304, an initial parameter of the camera and an initial temperature corresponding to the initial parameter are acquired according to the activation request. In 2306, a temperature of a light emitter is detected. In 2308, when a temperature difference between a present temperature of the light emitter and an initial temperature exceeds a threshold, a corresponding target parameter is acquired according to the present temperature of the light emitter. In 2310, a target preview image is captured according to the target parameter.

In one embodiment, the computer program is executed by the processor to enable the processor to perform the following operations. In 2402, a 3D processing instruction for an initial preview image is received. In 2404, an initial parameter corresponding to the initial preview image and an initial temperature corresponding to the initial parameter are acquired according to the 3D processing instruction. In 2406, a temperature of a light emitter is detected. In 2408, when a temperature difference between a present temperature of the light emitter and an initial temperature exceeds a threshold, a corresponding target parameter is acquired according to the present temperature of the light emitter. In 2410, a target preview image is captured according to the target parameter.

In one embodiment, the computer program is executed by the processor to enable the processor to perform the following operations. In 2502, a captured face image is matched with a pre-stored face image. In 2504, an initial parameter corresponding to the face image and an initial temperature corresponding to the initial parameter are acquired when the face image fails to match the pre-stored face image. In 2506, a temperature of a light emitter is detected. In 2508, when a temperature difference between a present temperature of the light emitter and an initial temperature exceeds a threshold, a corresponding target parameter is acquired according to the present temperature of the light emitter. In 2510, a target face image is captured according to the target parameter.

In one embodiment, the computer program is executed by the processor to enable the processor to perform the following operations. In 2602, a temperature of a light emitter is detected. In 2604, when a duration of a temperature difference between a present temperature of the light emitter and an initial temperature exceeding a threshold is greater than a preset time length, a corresponding target parameter is acquired according to the present temperature of the light emitter. In 2606, a target preview image is captured according to the target parameter.

Each module of the image processing apparatus 700 provided in the embodiments of the disclosure may be implemented in the form of a computer program illustrated in FIG. 15. The computer program may operate on a terminal or a server. A program module formed by the computer program may be stored on a memory of the terminal or the server. The computer program is executed by a processor to implement the operations of the method described in the embodiments of the disclosure.

As illustrated in FIG. 15, the embodiment of the disclosure also provides a computer-readable storage medium. A computer-readable storage medium may be a non-volatile computer-readable storage medium, and includes a computer program. When executed by one or more processors, the computer program may implement the operations of the image processing method in any one of the above embodiments.

In one embodiment, the computer program is executed by one or more processors to implement the following operations. In 202, a temperature of a light emitter is detected. In 204, when a temperature difference between a present temperature of the light emitter and an initial temperature exceeds a threshold, a target parameter is acquired. In 206, a predetermined operation is performed according to the target parameter.

In one embodiment, the computer program is executed by one or more processors to implement the following operations. In 1202, a temperature of a light emitter is detected. In 1204, when a temperature difference between a present temperature of the light emitter and an initial temperature exceeds a threshold, a corresponding target parameter is acquired according to the initial temperature and the temperature difference. In 1206, a preview image is corrected according to the target parameter.

In one embodiment, the computer program is executed by one or more processors to implement the following operations. In 1302, an activation request for a camera is received. In 1304, an initial parameter of the camera and an initial temperature corresponding to the initial parameter are acquired according to the activation request. In 1306, a temperature of a light emitter is detected. In 1308, when a temperature difference between a present temperature of the light emitter and an initial temperature exceeds a threshold, a corresponding target parameter is acquired according to the initial temperature and the temperature difference. In 1310, a preview image is corrected according to the target parameter.

In one embodiment, the computer program is executed by one or more processors to implement the following operations. In 1402, a 3D processing instruction for a preview image is received. In 1404, an initial parameter corresponding to the preview image and an initial temperature corresponding to the initial parameter are acquired according to the 3D processing instruction. In 1406, a temperature of a light emitter is detected. In 1408, when a temperature difference between a present temperature of the light emitter and an initial temperature exceeds a threshold, a corresponding target parameter is acquired according to the initial temperature and the temperature difference. In 1410, the preview image is corrected according to the target parameter.

In one embodiment, the computer program is executed by one or more processors to implement the following operations. In 1502, a captured face image is matched with a pre-stored face image. In 1504, an initial parameter corresponding to the face image and an initial temperature corresponding to the initial parameter are acquired when the face image fails to match the pre-stored face image. In 1506, a temperature of a light emitter is detected. In 1508, when a temperature difference between a present temperature of the light emitter and an initial temperature exceeds a threshold, a corresponding target parameter is acquired according to the initial temperature and the temperature difference. In 1510, the face image is corrected according to the target parameter.

In one embodiment, the computer program is executed by one or more processors to implement the following operations. In 1602, a temperature of a light emitter is detected. In 1604, when a duration of a temperature difference between a present temperature of the light emitter and an initial temperature exceeding a threshold is greater than a preset time length, a corresponding target parameter is acquired according to the initial temperature and the temperature difference. In 1606, a preview image is corrected according to the target parameter.

In one embodiment, the computer program is executed by one or more processors to implement the following operations. In 2202, a temperature of a light emitter is detected. In 2204, when a temperature difference between a present temperature of the light emitter and an initial temperature exceeds a threshold, a corresponding target parameter is acquired according to the present temperature of the light emitter. In 2206, a target preview image is captured according to the target parameter.

In one embodiment, the computer program is executed by one or more processors to implement the following operations. In 2302, an activation request for a camera is received. In 2304, an initial parameter of the camera and an initial temperature corresponding to the initial parameter are acquired according to the activation request. In 2306, a temperature of a light emitter is detected. In 2308, when a temperature difference between a present temperature of the light emitter and an initial temperature exceeds a threshold, a corresponding target parameter is acquired according to the present temperature of the light emitter. In 2310, a target preview image is captured according to the target parameter.

In one embodiment, the computer program is executed by one or more processors to implement the following operations. In 2402, a 3D processing instruction for an initial preview image is received. In 2404, an initial parameter corresponding to the initial preview image and an initial temperature corresponding to the initial parameter are acquired according to the 3D processing instruction. In 2406, a temperature of a light emitter is detected. In 2408, when a temperature difference between a present temperature of the light emitter and an initial temperature exceeds a threshold, a corresponding target parameter is acquired according to the present temperature of the light emitter. In 2410, a target preview image is captured according to the target parameter.

In one embodiment, the computer program is executed by one or more processors to implement the following operations. In 2502, a captured face image is matched with a pre-stored face image. In 2504, an initial parameter corresponding to the face image and an initial temperature corresponding to the initial parameter are acquired when the face image fails to match the pre-stored face image. In 2506, a temperature of a light emitter is detected. In 2508, when a temperature difference between a present temperature of the light emitter and an initial temperature exceeds a threshold, a corresponding target parameter is acquired according to the present temperature of the light emitter. In 2510, a target face image is captured according to the target parameter.

In one embodiment, the computer program is executed by one or more processors to implement the following operations. In 2602, a temperature of a light emitter is detected. In 2604, when a duration of a temperature difference between a present temperature of the light emitter and an initial temperature exceeding a threshold is greater than a preset time length, a corresponding target parameter is acquired according to the present temperature of the light emitter. In 2606, a target preview image is captured according to the target parameter.

The embodiment of the disclosure also provides a computer program product including an instruction. The computer program product, when operated on a computer, may enable the computer to perform the image processing method described in any one of the above embodiments.

Figure 16:
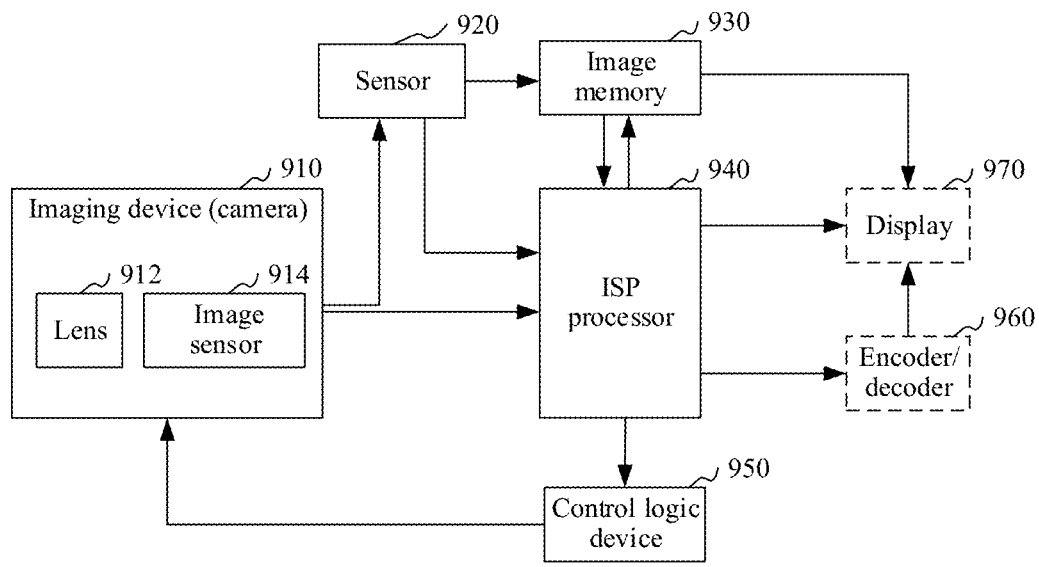
FIG. 16 illustrates a schematic diagram of an image processing circuit according to some embodiments of the disclosure.

The embodiment of the disclosure also provides an electronic device. The electronic device includes an image processing circuit. The image processing circuit may be implemented by hardware and/or software components, and may include various processing units defining an Image Signal Processing (ISP) pipeline. FIG. 16 illustrates a schematic diagram of an image processing circuit in one embodiment. As illustrated in FIG. 16, only various aspects of the image processing technology related to the embodiments of the disclosure are illustrated for ease of explanation.

As illustrated in FIG. 16, the image processing circuit includes an ISP processor 940 and a control logic device 950. Image data captured by an imaging device 910 is processed by the ISP processor 940 firstly, and the ISP processor 940 analyzes the image data to acquire image statistical information used for determining one or more control parameters of the imaging device 910. The imaging device 910 may include a camera having one or more lenses 912 and image sensors 914. The image sensor 914 may include a color filter array (for example, Bayer filter). The image sensor 914 may acquire light intensity and wavelength information captured by each of the imaging pixels in the image sensor 914 and provide a set of original image data that can be processed by the ISP processor 940. A sensor 920 (for example, a gyroscope) may provide captured parameters of image processing (for example, anti-shake parameters) to the ISP processor 940 based on a type of the sensor 920 interface. The sensor 920 interface may utilize a Standard Mobile Imaging Architecture (SMIA) interface, other serial or parallel camera interfaces, or a combination of the above interfaces.

In addition, the image sensor 914 may also send original image data to the sensor 920. The sensor 920 may provide the original image data to the ISP processor 940 based on the type of the sensor 920 interface, or the sensor 920 may store the original image data into an image memory 930.

The ISP processor 940 processes the original image data pixel by pixel in a variety of formats. For example, each image pixel may have a bit depth of 8, 10, 12, or 14 bits, and the ISP processor 940 may perform one or more image processing operations on the original image data, and may collect statistical information about the image data. The image processing operations may be performed according to the same or different bit depths.

The ISP processor 940 may also receive image data from the image memory 930. For example, the sensor 920 interface sends the original image data to the image memory 930, and the original image data in the image memory 930 is then provided to the ISP processor 940 for processing. The image memory 930 may be part of a memory apparatus, a storage device, or a separate dedicated memory within an electronic device, and may include Direct Memory Access (DMA) features.

When receiving the original image data from the image sensor 914 interface or from the sensor 920 interface or from the image memory 930, the ISP processor 940 may perform one or more image processing operations, such as time domain filtering. The processed image data may be sent to the image memory 930 for additional processing prior to being displayed. The ISP processor 940 receives processed data from the image memory 930 and performs image data processing on the processed data in an original domain and in RGB and YCbCr color spaces. The image data processed by the ISP processor 940 may be output to a display 970, so as to be viewed by a user and/or further processed by a graphic engine or Graphics Processing Unit (GPU). The output data of the ISP processor 940 may also be sent to the image memory 930, and the display 970 may read image data from the image memory 930. In one embodiment, the image memory 930 may be configured to implement one or more frame buffers. Additionally, the output data of the ISP processor 940 may be sent to an encoder/decoder 960 to encode/decode image data. The encoded image data may be saved and decompressed before being displayed on the display 970. The encoder/decoder 960 may be implemented by a CPU or GPU or coprocessor.

Statistical data determined by the ISP processor 940 may be sent to a control logic device 950. For example, the statistical data may include statistical information of the image sensor 914 such as auto exposure, auto white balance, auto focus, flicker detection, black level compensation, and shading correction on the lens 912. The control logic device 950 may include a processor and/or an MCU that executes one or more routines (such as firmware), and one or more routines may determine control parameters of the imaging device 910 and control parameters of the ISP processor 940 according to the received statistical data. For example, the control parameters of the imaging device 910 may include control parameters of the sensor 920 (such as gain, integration time of exposure control, and anti-shake parameters), camera flash control parameters, control parameters of the lens 912 (such as focus or zoom focal length), or a combination of these parameters, and the like. The ISP control parameters may include a gain level and color correction matrix for automatic white balance and color adjustment (e.g., during RGB processing), and a shading correction parameter on the lens 912.

In one embodiment, the imaging device 910 may be a laser camera 112 or an RGB camera 116 in FIG. 1. The ISP processor 940 may have the functions of both the first processor 130 and the second processor 120 in FIG. 1.

In the embodiments of the disclosure, the electronic device executes the computer program stored on the memory to implement the operations of the image processing method in the embodiments of the disclosure.

Any reference used in the disclosure to a memory, storage, a database or other media may include non-volatile and/or volatile memories. The appropriate non-volatile memory may include a read only memory (ROM), a Programmable ROM (PROM), an Electrically Programmable ROM (EPROM), an Electrically Erasable Programmable ROM (EEPROM), or a flash memory. The volatile memory may include a random access memory (RAM) and is used as an external cache memory. It is exemplarily but unlimitedly described that the RAM may be obtained in multiple forms, such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiments only describes several implementation modes of the disclosure specifically and in detail, but cannot be understood as limitations to the scope of the disclosure. It is to be noted that any variations or improvements made by those skilled in the art without departing from the concept of the disclosure shall fall within the scope of protection of the disclosure. Therefore, the scope of protection of the disclosure shall be subject to the scope of protection of the claims.

The invention claimed is:

1. An image processing method, comprising:
   detecting a temperature of a light emitter;
   acquiring, responsive to determining that a temperature difference between a present temperature of the light emitter and an initial temperature exceeds a threshold, a target parameter corresponding to the initial temperature and the temperature difference, the target parameter being a compensation parameter determined according to the initial temperature and the temperature difference between the present temperature of the light emitter and the initial temperature; and
   performing correction on a preview image according to the target parameter, or capturing a target preview image according to the target parameter, to enable a deviation between the preview image or the target preview image and real environment information to be reduced,
   wherein the operation of acquiring, responsive to determining that the temperature difference between the present temperature of the light emitter and the initial temperature exceeds the threshold, the target parameter corresponding to the initial temperature and the temperature difference comprises:
   acquiring, responsive to determining that a duration in which the temperature difference between the present temperature of the light emitter and the initial temperature exceeds the threshold is greater than a preset time length, the target parameter corresponding to the initial temperature and the temperature difference.

2. The image processing method according to claim 1, wherein after acquiring the target parameter corresponding to the initial temperature and the temperature difference, the method further comprises:
   updating the initial temperature according to the present temperature of the light emitter.

3. The image processing method according to claim 1, wherein before detecting the temperature of the light emitter, the method further comprises:
   receiving an activation request for a camera; and
   acquiring, according to the activation request, an initial parameter of the camera and the initial temperature corresponding to the initial parameter.

4. The image processing method according to claim 1, wherein before detecting the temperature of the light emitter, the method further comprises:
   receiving a 3D processing instruction for the preview image; and
   acquiring, according to the 3D processing instruction, an initial parameter of the preview image and the initial temperature corresponding to the initial parameter.

5. The image processing method according to claim 1, wherein before detecting the temperature of the light emitter, the method further comprises:
   matching a captured face image with a pre-stored face image;
   acquiring an initial parameter corresponding to the face image and the initial temperature corresponding to the initial parameter responsive to failure in matching of the face image and the pre-stored face image;
   the operation of performing correction on a preview image according to the target parameter comprises:
   performing correction on the face image according to the target parameter.

6. The image processing method according to claim 5, wherein the pre-stored face image comprises multiple pre-stored face images, and the method further comprises:
   acquiring the initial parameter corresponding to the face image and the initial temperature corresponding to the initial parameter responsive to determining that a number of times of failure in matching of the face image and the multiple pre-stored face images exceeds a preset number of times.

7. An electronic device, comprising a memory and a processor, the memory storing a computer program, wherein the computer program is executed by the processor to cause the processor to perform the following operations:
   detecting a temperature of a light emitter;
   acquiring, responsive to determining that a temperature difference between a present temperature of the light emitter and an initial temperature exceeds a threshold, a target parameter corresponding to the initial temperature and the temperature difference, the target parameter being a compensation parameter determined according to the initial temperature and the temperature difference between the present temperature of the light emitter and the initial temperature; and
   performing correction on a preview image according to the target parameter, or capturing a target preview image according to the target parameter, to enable a deviation between the preview image or the target preview image and real environment information to be reduced,
   wherein the computer program is executed by the processor to cause the processor to further perform the following operation:
   acquiring, responsive to determining that a duration in which the temperature difference between the present temperature of the light emitter and the initial temperature exceeds the threshold is greater than a preset time length, the target parameter corresponding to the initial temperature and the temperature difference.

8. The electronic device according to claim 7, wherein the computer program is executed by the processor to cause the processor to further perform the following operations:
   receiving an activation request for a camera; and
   acquiring an initial parameter of the camera and the initial temperature corresponding to the initial parameter according to the activation request.

9. The electronic device according to claim 7, wherein the computer program is executed by the processor to cause the processor to further perform the following operations:
   receiving a 3D processing instruction for the preview image; and
   acquiring an initial parameter of the preview image and the initial temperature corresponding to the initial parameter according to the 3D processing instruction.

10. The electronic device according to claim 7, wherein the computer program is executed by the processor to cause the processor to further perform the following operations:

matching a captured face image with a pre-stored face image;

acquiring an initial parameter corresponding to the face image and the initial temperature corresponding to the initial parameter responsive to failure in matching of the face image and the pre-stored face image; and after acquiring the target parameter corresponding to the initial temperature and the temperature difference, performing correction on the face image according to the target parameter.

11. A non-transitory computer-readable storage medium, having a computer program stored thereon, wherein the computer program is executed by a processor to implement the following operations:

detecting a temperature of a light emitter;

acquiring, responsive to determining that a temperature difference between a present temperature of the light emitter and an initial temperature exceeds a threshold, a target parameter corresponding to the initial temperature and the temperature difference, the target parameter being a compensation parameter determined according to the initial temperature and the temperature difference between the present temperature of the light emitter and the initial temperature; and performing correction on a preview image according to the target parameter, or capturing a target preview image according to the target parameter, to enable a deviation between the preview image or the target preview image and real environment information to be reduced, wherein the computer program is executed by a processor to further implement the following operation:

acquiring, responsive to determining that a duration in which the temperature difference between the present temperature of the light emitter and the initial temperature exceeds the threshold is greater than a preset time length, the target parameter corresponding to the initial temperature and the temperature difference.

* * * * *